(12) United States Patent
Huang et al.

(10) Patent No.: US 9,166,477 B2
(45) Date of Patent: Oct. 20, 2015

(54) CONTROL CIRCUIT FOR POWER CONVERTER AND RELATED CONTROL METHOD

(71) Applicant: Richtek Technology Corporation, Hsinchu (TW)

(72) Inventors: Wei-Jen Huang, New Taipei (TW); Chueh-Kuei Jan, Hsinchu County (TW); Tsung-Wei Huang, Taipei (TW); Shui-Mu Lin, Taichung (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 101 days.

(21) Appl. No.: 14/223,580

(22) Filed: Mar. 24, 2014

(65) Prior Publication Data

US 2014/0320094 A1    Oct. 30, 2014

(30) Foreign Application Priority Data

Apr. 26, 2013   (TW) .............................. 102115175 A (51) Int. Cl.
  *G05F 1/565*  (2006.01)
  *H02M 3/156*  (2006.01)
  *H02M 1/00*  (2007.01)

(52) U.S. Cl.
  CPC ...... *H02M 3/156* (2013.01); *H02M 2001/0032* (2013.01); *Y02B 70/16* (2013.01)

(58) Field of Classification Search
  CPC .. H02M 3/285; H02M 3/315; H02M 3/33584
  USPC ................. 323/235, 242, 243, 246, 282–286, 323/288–290, 351, 908
  See application file for complete search history.

(56) References Cited

U.S. PATENT DOCUMENTS

| | | | | |
|---|---|---|---|---|
| 7,068,023 B2 * | 6/2006 | Okada | ...................... | G05F 1/575 323/285 |
| 7,298,124 B2 * | 11/2007 | Kan | ....................... | H02M 3/156 323/224 |
| 7,362,593 B2 * | 4/2008 | Yang | ................. | H02M 3/33507 363/21.13 |
| 7,446,519 B2 * | 11/2008 | Low | .................... | H02M 3/1588 323/284 |
| 7,772,810 B2 * | 8/2010 | Buethker | ............. | H02M 3/1582 323/224 |
| 8,067,929 B2 * | 11/2011 | Huang | ..................... | B01J 13/04 323/284 |
| 8,129,961 B2 * | 3/2012 | Buethker | ............. | H02M 3/1582 323/224 |
| 8,253,397 B2 * | 8/2012 | Collins | ................. | H02M 3/156 323/271 |
| 8,319,482 B2 * | 11/2012 | Matsuo | ............... | H02M 3/1588 323/224 |

(Continued)

*Primary Examiner* — Adolf Berhane
*Assistant Examiner* — Nusrat Quddus
(74) *Attorney, Agent, or Firm* — Birch, Stewart, Kolasch & Birch, LLP (57) ABSTRACT

A control circuit of a power converter includes: a zero current detection circuit for detecting a current flowing between an inductor and a voltage output terminal of the power converter to generate a zero current detection signal; an adjusting circuit for generating an adjustment signal according to the zero current detection signal; a clock signal generating circuit for adjusting a frequency of a clock signal according to the adjustment signal; a periodical signal generating circuit for generating a periodical signal according to the clock signal; an error detection circuit for generating an error signal; and a control signal generating circuit for generating a control signal to control operations of a power switch. If the and amount of pulses generated by the zero current detection circuit satisfy a predetermined condition, the adjusting circuit switches the power converter's operation mode from DCM to CCM.

23 Claims, 4 Drawing Sheets

(56) References Cited

U.S. PATENT DOCUMENTS

| | | | |
|---|---|---|---|
| 2005/0185353 A1* | 8/2005 | Rasmussen | H02M 1/44 361/93.9 |
| 2010/0283391 A1* | 11/2010 | Braunshtein | H05B 37/0263 315/127 |
| 2011/0018516 A1* | 1/2011 | Notman | H02M 3/1588 323/284 |
| 2011/0043181 A1* | 2/2011 | Jing | H02M 3/158 323/288 |
| 2011/0050185 A1* | 3/2011 | Notman | H02M 3/1588 323/271 |
| 2013/0043852 A1* | 2/2013 | Marsili | H02M 3/157 323/283 |
| 2013/0051089 A1* | 2/2013 | Pan | H02M 3/33507 363/21.17 |

* cited by examiner

CONTROL CIRCUIT FOR POWER CONVERTER AND RELATED CONTROL METHOD

CROSS-REFERENCE TO RELATED APPLICATIONS

This application claims the benefit of priority to Patent Application No. 102115175, filed in Taiwan on Apr. 26, 2013; the entirety of which is incorporated herein by reference for all purposes.

BACKGROUND

The disclosure generally relates to a power converter and, more particularly, to a control circuit capable of stabilizing an output voltage of the power converter and a control method thereof.

A power converter may operate at a discontinuous conduction mode (DCM) or a continuous conduction mode (CCM) to supply required power to a load and to improve energy efficiency of the power converter.

Generally, a control circuit of the power converter configures the power converter to operate at the discontinuous conduction mode when the load is a light load, and configures the power converter to operate at the continuous conduction mode when the load is a heavy load. However, when the load condition is closing to a switching boundary between the two operation modes, a traditional control circuit repeatedly switches the power converter between two operation modes. In this situation, it easily causes the circuitry loop of the power converter to be unstable, thereby resulting in unstable output voltage.

SUMMARY

An example embodiment of a control circuit of a power converter is disclosed. The power converter comprises an inductor and a first power switch, a first terminal of the first power switch is coupled with a predetermined terminal of the inductor, and a second terminal of the first power switch is coupled with a fixed voltage terminal. The control circuit comprises: a zero current detection circuit, configured to operably detect a current flowing between the predetermined terminal and a voltage output terminal of the power converter to generate a zero current detection signal; an adjusting circuit, coupled with the zero current detection circuit, and configured, configured to operably generate an adjustment signal according to the zero current detection signal; a clock signal generating circuit, coupled with the adjusting circuit, and configured, configured to operably adjust a frequency of a clock signal according to the adjustment signal; a periodical signal generating circuit, coupled with the clock signal generating circuit, and configured, configured to operably generate a periodical signal according to the clock signal; an error detection circuit, configured to operably generate an error signal according to a reference signal and a feedback signal corresponding to an output voltage signal of the power converter when coupled with the power converter; and a control signal generating circuit, coupled with the periodical signal generating circuit and the error detection circuit, and configured, configured to operably generate a control signal according to the periodical signal and the error signal to control operations of the first power switch; wherein when the power converter operates at a discontinuous conduction mode, if a width of a pulse generated by the zero current detection circuit in multiple clock cycles is less than a first predetermined width and an amount of pulses generated by the zero current detection circuit in the multiple clock cycles is greater than a first predetermined value, the adjusting circuit utilizes the adjustment signal to control the clock signal generating circuit to increase the frequency of the clock signal, so as to enable the periodical signal generating circuit to increase a frequency of the periodical signal to switch the power converter from the discontinuous conduction mode to a continuous conduction mode, and a first switching frequency of the first power switch at the discontinuous conduction mode is lower than a second switching frequency of the first power switch at the continuous conduction mode.

Another example embodiment of a control circuit of a power converter is disclosed. The power converter comprises an inductor and a first power switch, a first terminal of the first power switch is coupled with a predetermined terminal of the inductor, and a second terminal of the first power switch is coupled with a fixed voltage terminal. The control circuit comprises: a zero current detection circuit, configured to operably detect a current flowing between the predetermined terminal and a voltage output terminal of the power converter to generate a zero current detection signal; an adjusting circuit, coupled with the zero current detection circuit, and configured, configured to operably generate an adjustment signal according to the zero current detection signal; a clock signal generating circuit, coupled with the adjusting circuit, and configured, configured to operably adjust a frequency of a clock signal according to the adjustment signal; a periodical signal generating circuit, coupled with the clock signal generating circuit, and configured, configured to operably generate a periodical signal according to the clock signal; an error detection circuit, configured to operably generate an error signal according to a reference signal and a feedback signal corresponding to an output voltage signal of the power converter when coupled with the power converter; and a control signal generating circuit, coupled with the periodical signal generating circuit and the error detection circuit, and configured, configured to operably generate a control signal according to the periodical signal and the error signal to control operations of the first power switch; wherein when the power converter operates at a continuous conduction mode, if a width of a pulse generated by the zero current detection circuit in multiple clock cycles is greater than a second predetermined width and an amount of pulses generated by the zero current detection circuit in the multiple clock cycles is greater than a second predetermined value, the adjusting circuit utilizes the adjustment signal to control the clock signal generating circuit to decrease the frequency of the clock signal, so as to enable the periodical signal generating circuit to decrease a frequency of the periodical signal to switch the power converter from the continuous conduction mode to a discontinuous conduction mode, and a first switching frequency of the first power switch at the discontinuous conduction mode is lower than a second switching frequency of the first power switch at the continuous conduction mode.

Another example embodiment of a control circuit of a power converter is disclosed. The power converter comprises an inductor. The control circuit comprises: a first power switch, wherein a first terminal of the first power switch is coupled with a predetermined terminal of the inductor, and a second terminal of the first power switch is coupled with a fixed voltage terminal; a zero current detection circuit, coupled between the predetermined terminal and a voltage output terminal of the power converter, and configured, configured to operably detect a current flowing between the predetermined terminal and the voltage output terminal to generate a zero current detection signal; an adjusting circuit, coupled with the zero current detection circuit, and configured, configured to operably generate an adjustment signal according to the zero current detection signal; a clock signal generating circuit, coupled with the adjusting circuit, and configured, configured to operably adjust a frequency of a clock signal according to the adjustment signal; a periodical signal generating circuit, coupled with the clock signal generating circuit, and configured, configured to operably generate a periodical signal according to the clock signal; an error detection circuit, configured to operably generate an error signal according to a reference signal and a feedback signal corresponding to an output voltage signal of the power converter when coupled with the power converter; and a control signal generating circuit, coupled with the periodical signal generating circuit and the error detection circuit, and configured, configured to operably generate a control signal according to the periodical signal and the error signal to control operations of the first power switch; wherein when the power converter operates at a discontinuous conduction mode, if a width of a pulse generated by the zero current detection circuit in multiple clock cycles is less than a first predetermined width and an amount of pulses generated by the zero current detection circuit in the multiple clock cycles is greater than a first predetermined value, the adjusting circuit utilizes the adjustment signal to control the clock signal generating circuit to increase the frequency of the clock signal, so as to enable the periodical signal generating circuit to increase a frequency of the periodical signal to switch the power converter from the discontinuous conduction mode to a continuous conduction mode, and a first switching frequency of the first power switch at the discontinuous conduction mode is lower than a second switching frequency of the first power switch at the continuous conduction mode.

Another example embodiment of a control circuit of a power converter is disclosed. The power converter comprises an inductor. The control circuit comprises: a first power switch, wherein a first terminal of the first power switch is coupled with a predetermined terminal of the inductor, and a second terminal of the first power switch is coupled with a fixed voltage terminal; a zero current detection circuit, coupled between the predetermined terminal and a voltage output terminal of the power converter, configured to operably detect a current flowing between the predetermined terminal and the voltage output terminal to generate a zero current detection signal; an adjusting circuit, coupled with the zero current detection circuit, configured to operably generate an adjustment signal according to the zero current detection signal; a clock signal generating circuit, coupled with the adjusting circuit, configured to operably adjust a frequency of a clock signal according to the adjustment signal; a periodical signal generating circuit, coupled with the clock signal generating circuit, configured to operably generate a periodical signal according to the clock signal; an error detection circuit, configured to operably generate an error signal according to a reference signal and a feedback signal corresponding to an output voltage signal of the power converter when coupled with the power converter; and a control signal generating circuit, coupled with the periodical signal generating circuit and the error detection circuit, configured to operably generate a control signal according to the periodical signal and the error signal to control operations of the first power switch; wherein when the power converter operates at a continuous conduction mode, if a width of a pulse generated by the zero current detection circuit in multiple clock cycles is greater than a second predetermined width and an amount of pulses generated by the zero current detection circuit in the multiple clock cycles is greater than a second predetermined value, the adjusting circuit utilizes the adjustment signal to control the clock signal generating circuit to decrease the frequency of the clock signal, so as to enable the periodical signal generating circuit to decrease a frequency of the periodical signal to switch the power converter from the continuous conduction mode to a discontinuous conduction mode, and a first switching frequency of the first power switch at the discontinuous conduction mode is lower than a second switching frequency of the first power switch at the continuous conduction mode.

Another example embodiment of a control method of a power converter is disclosed. The power converter comprises an inductor and a first power switch, a first terminal of the first power switch is coupled with a predetermined terminal of the inductor, and a second terminal of the first power switch is coupled with a fixed voltage terminal. The control method comprises: utilizing a zero current detection circuit to detect a current flowing between the predetermined terminal and a voltage output terminal of the power converter to generate a zero current detection signal; generating an adjustment signal according to the zero current detection signal; utilizing a clock signal generating circuit to adjust a frequency of a clock signal according to the adjustment signal; generating a periodical signal according to the clock signal; generating an error signal according to a reference signal and a feedback signal corresponding to an output voltage signal of the power converter; generating a control signal according to the periodical signal and the error signal to control operations of the first power switch; and when the power converter operates at a discontinuous conduction mode, if a width of a pulse generated by the zero current detection circuit in multiple clock cycles is less than a first predetermined width and an amount of pulses generated by the zero current detection circuit in the multiple clock cycles is greater than a first predetermined value, utilizing the adjustment signal to control the clock signal generating circuit to increase the frequency of the clock signal, so as to increase a frequency of the periodical signal to switch the power converter from the discontinuous conduction mode to a continuous conduction mode; wherein a first switching frequency of the first power switch at the discontinuous conduction mode is lower than a second switching frequency of the first power switch at the continuous conduction mode.

Another example embodiment of a control method of a power converter is disclosed. The power converter comprises an inductor and a first power switch, a first terminal of the first power switch is coupled with a predetermined terminal of the inductor, and a second terminal of the first power switch is coupled with a fixed voltage terminal. The control method comprises: utilizing a zero current detection circuit to detect a current flowing between the predetermined terminal and a voltage output terminal of the power converter to generate a zero current detection signal; generating an adjustment signal according to the zero current detection signal; utilizing a clock signal generating circuit to adjust a frequency of a clock signal according to the adjustment signal; generating a periodical signal according to the clock signal; generating an error signal according to a reference signal and a feedback signal corresponding to an output voltage signal of the power converter; generating a control signal according to the periodical signal and the error signal to control operations of the first power switch; and when the power converter operates at a continuous conduction mode, if a width of a pulse generated by the zero current detection circuit in multiple clock cycles is greater than a second predetermined width and an amount of pulses generated by the zero current detection circuit in the multiple clock cycles is greater than a second predetermined value, utilizing the adjustment signal to control the clock signal generating circuit to decrease the frequency of the clock signal, so as to decrease a frequency of the periodical signal to switch the power converter from the continuous conduction mode to a discontinuous conduction mode; wherein a first switching frequency of the first power switch at the discontinuous conduction mode is lower than a second switching frequency of the first power switch at the continuous conduction mode.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
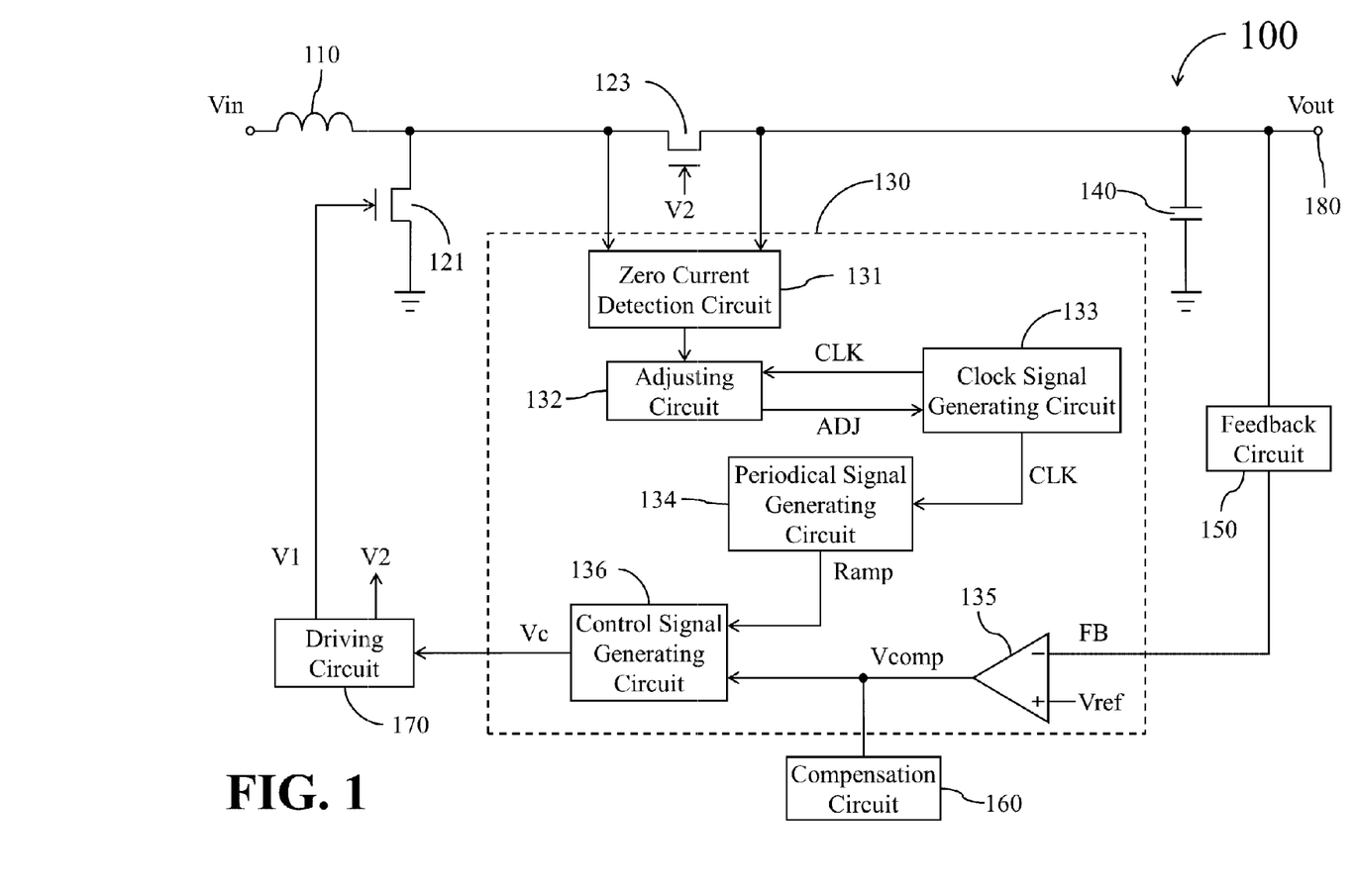
FIG. 1 shows a simplified functional block diagram of a power converter according to one embodiment of the present disclosure.

FIG. 1 shows a simplified functional block diagram of a power converter 100 according to one embodiment of the present disclosure. In this embodiment, the power converter 100 is a synchronous boost converter, but the concept of the present disclosure is also applicable to the power converter of other types, such as (but not limited to) an asynchronous boost converter, a synchronous buck converter, an asynchronous buck converter, a synchronous inverted converter, an asynchronous inverted converter, a synchronous buck-boost converter, or an asynchronous buck-boost converter. As shown in FIG. 1, the power converter 100 comprises an inductor 110, a first power switch 121, a second power switch 123, a control circuit 130, an output capacitor 140, a feedback circuit 150, a compensation circuit 160, a driving circuit 170, and a voltage output terminal 180. The inductor 110 is coupled between an input voltage signal Vin of the power converter 100 and a first terminal of the first power switch 121. A second terminal of the first power switch 121 is coupled with a fixed voltage terminal (e.g., a ground terminal). A first terminal of the second power switch 123 is coupled with a predetermined terminal of the inductor 110, and a second terminal of the second power switch 123 is coupled with the voltage output terminal 180. The voltage output terminal 180 is configured to operably provide an output voltage signal Vout. A terminal of the output capacitor 140 is coupled with the voltage output terminal 180, and another terminal of the output capacitor 140 is coupled with a fixed voltage terminal (e.g., the ground terminal). The output capacitor 140 is configured to operably stabilize the output voltage signal Vout. The feedback circuit 150 is coupled with the voltage output terminal 180, and configured to operably generate a feedback signal FB corresponding to the output voltage signal Vout. The control circuit 130 is coupled with the feedback circuit 150, the compensation circuit 160, and the driving circuit 170, and configured to operably generate a control signal Vc for controlling the driving circuit 170 according to the feedback signal FB. Under the control of the control circuit 130, the driving circuit 170 generates driving signals V1 and V2 to respectively control operations of the first power switch 121 and the second power switch 123 so as to adjust the operation modes of the power converter 100, so that the power converter 100 converts the input voltage signal Vin into a stable output voltage signal Vout for use in subsequent-stage circuits.

In the embodiment of FIG. 1, the control circuit 130 comprises a zero current detection circuit 131, an adjusting circuit 132, a clock signal generating circuit 133, a periodical signal generating circuit 134, an error detection circuit 135, and a control signal generating circuit 136. The zero current detection circuit 131 is coupled between the predetermined terminal of the inductor 110 and the voltage output terminal 180 of the power converter 100. The zero current detection circuit 131 is configured to operably detect a current flowing between the predetermined terminal and the voltage output terminal 180 so as to generate a zero current detection signal. The adjusting circuit 132 is coupled with the zero current detection circuit 131, and configured to operably generate an adjustment signal ADJ according to the zero current detection signal. The clock signal generating circuit 133 is coupled with the adjusting circuit 132, and configured to operably adjust a frequency of a clock signal CLK according to the adjustment signal ADJ. The periodical signal generating circuit 134 is coupled with the clock signal generating circuit 133, and configured to operably generate a periodical signal Ramp according to the clock signal CLK. When the error detection circuit 135 is coupled with the feedback circuit 150 of the power converter 100, the error detection circuit 135 generates an error signal Vcomp according to a reference signal Vref and the feedback signal FB. The control signal generating circuit 136 is coupled with the periodical signal generating circuit 134 and the error detection circuit 135, and configured to operably generate the control signal Vc according to the periodical signal Ramp and the error signal Vcomp, so as to control the operations of the first power switch 121 and the second power switch 123.

In practice, the zero current detection circuit 131 may generate a corresponding indication pulse in the zero current detection signal when the current flowing between the predetermined terminal of the inductor 110 and the voltage output terminal 180 is less than a threshold value (e.g., 0.05 A). The clock signal generating circuit 133 may be realized with various oscillators, phase-locked loops (PLL), or delay-locked loops (DLL). The periodical signal Ramp generated by the periodical signal generating circuit 134 may be various ramp signals, square wave signals, or sine wave signals. Additionally, the connection of the inverting input terminal and the non-inverting input terminal of the aforementioned error detection circuit 135 is only one embodiment rather than a restriction to the practical implementations. It would be appreciated by the person having ordinary skill in the art that the connection of the input terminals of the error detection circuit 135 could be swapped with each other, and peripheral circuits and active level of signals could be correspondingly modified to achieve the same or similar functions as the aforementioned embodiments. Alternatively, the control signal generating circuit 136 may be realized with various pulse width modulation (PWM) signal generators or pulse frequency modulation (PFM) signal generators. For example, the control signal generating circuit 136 may be realized with a flip-flop, a latch, or a circuitry combination of other logic circuits.

Different functional blocks of the aforementioned power converter 100 may be respectively realized with different circuits, or may be integrated into a single circuit chip. For example, at least one of the feedback circuit 150, the compensation circuit 160, and the driving circuit 170 may be integrated into the control circuit 130 to form a single controller IC. In practice, the first power switch 121 and/or the second power switch 123 may be also integrated into the control circuit 130 to form a single converter IC.

For the purposes of illustration, other components in the power converter 100 and connections thereof are not shown in FIG. 1. The operations of the control circuit 130 will be further described in the following by reference to FIG. 2.

Figure 2:
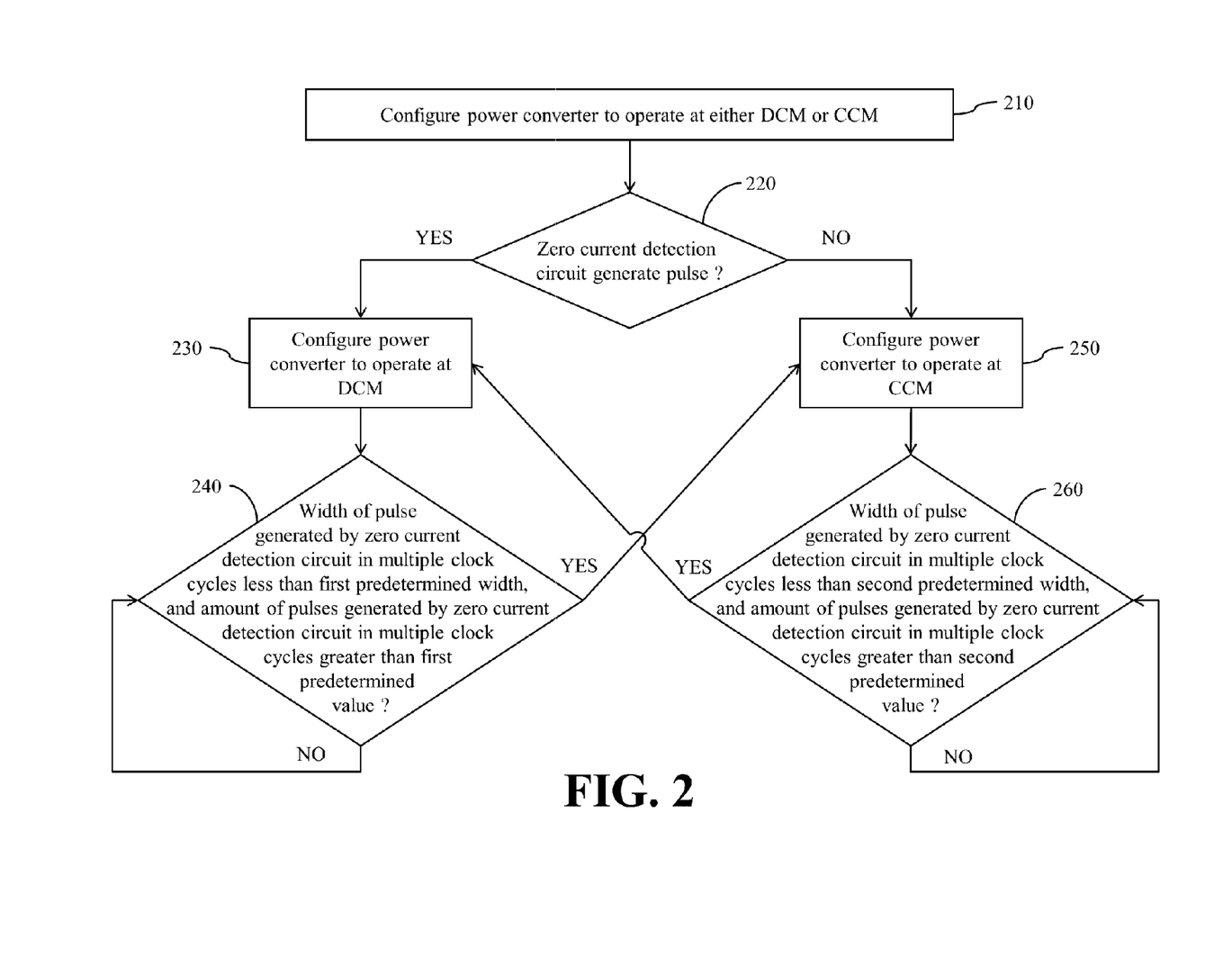
FIG. 2 shows a simplified flowchart illustrating a control method of the power converter in FIG. 1 according to one embodiment of the present disclosure.

FIG. 2 shows a simplified flowchart illustrating a control method of the power converter 100 according to one embodiment of the present disclosure.

In the operation 210, the control circuit 130 configures the power converter 100 to operate at either a discontinuous conduction mode (DCM) or a continuous conduction mode (CCM).

For the purpose of explanatory convenience, it is herein assumed that the control circuit 130 configures the power converter 100 to operate at the continuous conduction mode in the operation 210. In this situation, the control circuit 130 controls the operations of the first power switch 121 and the second power switch 123 through the driving circuit 170, so as to switch the first power switch 121 at a second switching frequency and to switch the second power switch 123 at a fourth switching frequency. The aforementioned second switching frequency may be the same as the fourth switching frequency or slightly differs from the fourth switching frequency. During the operations of the power converter 100, the adjusting circuit 132 continuously performs the operation 220 to determine whether the zero current detection circuit 131 generates pulses or not.

Figure 3:
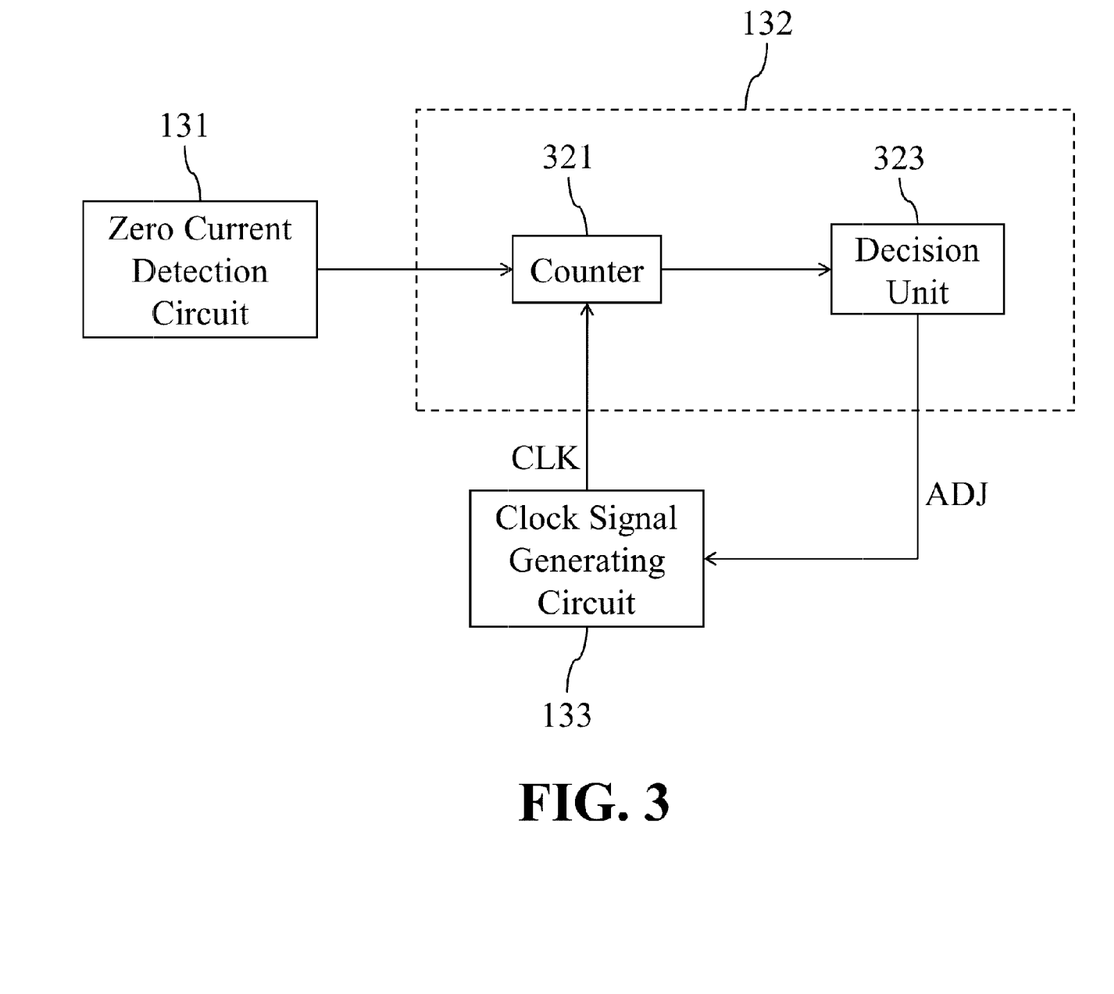
FIG. 3 shows a simplified functional block diagram of an adjusting circuit in FIG. 1 according to one embodiment of the present disclosure.

Please refer to FIG. 3, which shows a simplified functional block diagram of the adjusting circuit 132 in FIG. 1 according to one embodiment of the present disclosure. In the embodiment in FIG. 3, the adjusting circuit 132 comprises a counter 321 and a decision unit 323. The counter 321 is coupled with the zero current detection circuit 131 and the clock signal generating circuit 133, and configured to operably calculate an amount of pulses in the zero current detection signal to generate a count value. For example, the counter 321 may add one to the count value every time an indication pulse appears in the zero current detection signal.

If the decision unit 323 of the adjusting circuit 132 detects an increment of the count value outputted from the counter 321 in the operation 220, it means that the adjusting circuit 132 has detected the presence of indication pulses generated by the zero current detection circuit 131. It also means that a zero current situation occurs between the predetermined terminal of the inductor 110 and the voltage output terminal 180. In this situation, the control circuit 130 performs the operation 230. On the contrary, if no indication pulse generated by the zero current detection circuit 131 is detected by the adjusting circuit 132 in the operation 220, the control circuit 130 performs the operation 250.

In the operation 230, the control circuit 130 configures the power converter 100 to operate at the discontinuous conduction mode. In this situation, the decision unit 323 of the adjusting circuit 132 utilizes the adjustment signal ADJ to control the clock signal generating circuit 133 to lower the frequency of the clock signal CLK. After the clock signal generating circuit 133 lowers the frequency of the clock signal CLK, the periodical signal generating circuit 134 lowers a frequency of the periodical signal Ramp according to the clock signal CLK having reduced frequency. In this situation, the control signal generating circuit 136 generates the control signal Vc according to the error signal Vcomp and the periodical signal Ramp having reduced frequency, so as to control the operations of the first power switch 121 and the second power switch 123 through the driving circuit 170, thereby switching the first power switch 121 at a first switching frequency and switching the second power switch 123 at a third switching frequency. The first switching frequency is lower than the aforementioned second switching frequency, and the third switching frequency is lower than the aforementioned fourth switching frequency. Additionally, the aforementioned first switching frequency may be the same as the third switching frequency or slightly differs from the third switching frequency.

While the power converter 100 operates at the discontinuous conduction mode, the adjusting circuit 132 continuously performs the operation 240 to determine whether or not a width of the pulse generated by the zero current detection circuit 131 in multiple clock cycles is less than a first predetermined width, and to determine whether or not an amount of pulses generated by the zero current detection circuit 131 in the multiple clock cycles is greater than a first predetermined value. If the width of the pulse generated by the zero current detection circuit 131 in the multiple clock cycles is less than the first predetermined width and the amount of pulses generated by the zero current detection circuit 131 in the multiple clock cycles is greater than the first predetermined value, it means that the load condition of the power converter 100 at that moment closes to but yet reaches the conventional switching boundary of the two operation modes. In this situation, the control circuit 130 performs the operation 250 to switch the power converter 100 to the continuous conduction mode in advance. Otherwise, the control circuit 130 continuously configures the power converter 100 to operate at the discontinuous conduction mode. For example, the control circuit 130 may perform the operation 250 if no pulse is generated by the zero current detection circuit 131 in multiple successive clock cycles.

In the operation 250, the control circuit 130 configures the power converter 100 to operate at the continuous conduction mode. In this situation, the decision unit 323 of the adjusting circuit 132 utilizes the adjustment signal ADJ to control the clock signal generating circuit 133 to increase the frequency of the clock signal CLK. After the clock signal generating circuit 133 increases the frequency of the clock signal CLK, the periodical signal generating circuit 134 increases the frequency of the periodical signal Ramp according to the clock signal CLK having increased frequency. In this situation, the control signal generating circuit 136 generates the control signal Vc according to the error signal Vcomp and the periodical signal Ramp having increased frequency, so as to control the operations of the first power switch 121 and the second power switch 123 through the driving circuit 170, thereby switching the first power switch 121 at the second switching frequency and switching the second power switch 123 at the fourth switching frequency..

While the power converter 100 operates at the continuous conduction mode, the adjusting circuit 132 continuously performs the operation 260 to determine whether or not a width of the pulse generated by the zero current detection circuit 131 in multiple clock cycles is greater than a second predetermined width, and to determine whether or not an amount of pulses generated by the zero current detection circuit 131 in the multiple clock cycles is greater than a second predetermined value. If the width of the pulse generated by the zero current detection circuit 131 in the multiple clock cycles is greater than the second predetermined width and the amount of pulses generated by the zero current detection circuit 131 in the multiple clock cycles is greater than the second predetermined value, it means that the load condition of the power converter 100 at that moment closes to but yet reaches the conventional switching boundary of the two operation modes. In this situation, the control circuit 130 performs the aforementioned operation 230 to switch the power converter 100 to the discontinuous conduction mode in advance. Otherwise, the control circuit 130 continuously configures the power converter 100 to operate at the continuous conduction mode. For example, the control circuit 130 may perform the operation 230 if the zero current detection circuit 131 generates a pulse in each of multiple successive clock cycles.

In practice, the aforementioned first predetermined width may be the same or greater than the aforementioned second predetermined width.

As can be appreciated from the foregoing descriptions, the adjusting circuit 132 of the control circuit 130 determines whether or not the load condition of the power converter 100 closes to the conventional switching boundary of the two operation modes according to the detection results of the zero current detection circuit 131. Once the load condition of the power converter 100 closes to but yet reaches the conventional switching boundary of the two operation modes, the control circuit 130 switches the power converter 100 from the current operation mode to another operation mode in advance. For example, in the aforementioned embodiment, when the power converter 100 operates at the discontinuous conduction mode, if the load condition of the power converter 100 closes to but yet reaches the conventional switching boundary of the two operation modes, the control circuit 130 would switch the power converter 100 from the discontinuous conduction mode to the continuous conduction mode in advance. Similarly, when the power converter 100 operates at the continuous conduction mode, if the load condition of the power converter 100 closes to but reaches the conventional switching boundary of the two operation modes, the control circuit 130 would switch the power converter 100 from the continuous conduction mode to the discontinuous conduction mode in advance.

In other words, the control circuit 130 switches the operation mode of the power converter 100 in advance before the load condition of the power converter 100 reaches the conventional switching boundary of the two operation modes. Such approach is equivalent to creating a hysteresis region for the switching of the operation mode of the power converter 100. As a result, when the load condition of the power converter 100 reaches the conventional switching boundary of the two operation modes, the control circuit 130 does not repeatedly switch the power converter 100 between the discontinuous conduction mode and the continuous conduction mode. Accordingly, the aforementioned control method greatly improves the stability of the output voltage signal Vout of the power converter 100 and also increases the energy conversion efficiency of the power converter 100.

In practice, the aforementioned first predetermined value may be the same as the second predetermined value, or may be different from the second predetermined value. Additionally, the structure if the aforementioned control circuit 130 and related method for controlling the power converter are also applicable to asynchronous power converters.

Figure 4:
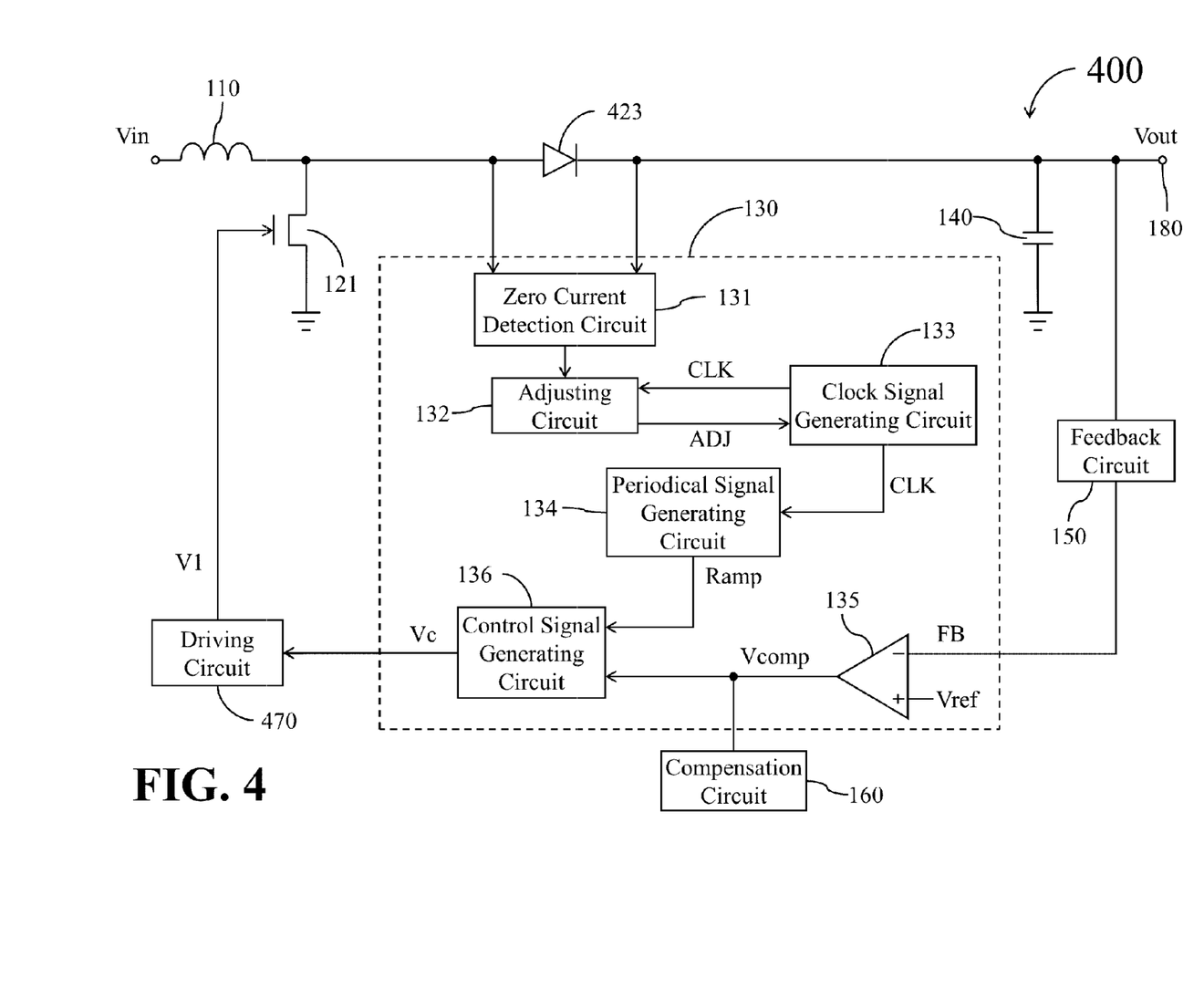
FIG. 4 shows a simplified functional block diagram of a power converter according to another embodiment of the present disclosure.

For example, FIG. 4 shows a simplified functional block diagram of a power converter 400 according to another embodiment of the present disclosure. In this embodiment, the power converter 400 is an asynchronous boost converter. The power converter 400 is similar to the aforementioned power converter 100, and a difference between the two embodiments is in that the second power switch 123 and the driving circuit 170 of the aforementioned power converter 100 are respectively replaced by a diode 423 and a driving circuit 470 in the power converter 400. Under the control of the control circuit 130 of the power converter 400, a driving circuit 470 generates the driving signal V1 to control the operation of the first power switch 121 to thereby adjust the operation mode of the power converter 400, so that the power converter 400 converts the input voltage signal Vin into a stable output voltage signal Vout for use in subsequent-stage circuits.

The descriptions regarding the implementations, operations, and related advantages of other functional blocks in the power converter 100 are also applicable to the power converter 400 of FIG. 4, and thus the descriptions will not be repeated here for the sake of brevity.

Additionally, the aforementioned power converters 100 and 400 are boost converters, but they are merely exemplary embodiments, rather than a restriction to the practical implementations. In practice, the structure of the aforementioned control circuit 130 and related control method for controlling the power converter are also applicable to the power converters of other structures, such as buck-boost power converters or buck power converters.

The term "voltage signal" used throughout the description and the claims may be expressed in the format of a current in implementations, and the term "current signal" used throughout the description and the claims may be expressed in the format of a voltage in implementations.

As can be appreciated from the foregoing descriptions, the control circuit 130 switches the operation mode of the power converter in advance before the load condition of the power converter reaches the conventional switching boundary of the two operation modes. As a result, when the load condition of the power converter reaches the conventional switching boundary of the two operation modes, the control circuit 130 does not repeatedly switch the power converter 100 between the discontinuous conduction mode and the continuous conduction mode. Accordingly, the structure of the aforementioned control circuit 130 and related control method for controlling the power converter greatly improves the stability of the output voltage signal Vout of the power converter and also increases the energy conversion efficiency of the power converter.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit of a power converter, the power converter comprising an inductor and a first power switch, a first terminal of the first power switch being coupled with a predetermined terminal of the inductor, and a second terminal of the first power switch being coupled with a fixed voltage terminal, the control circuit comprising:
- a zero current detection circuit, configured to operably detect a current flowing between the predetermined terminal and a voltage output terminal of the power converter to generate a zero current detection signal;
- an adjusting circuit, coupled with the zero current detection circuit, configured to operably generate an adjustment signal according to the zero current detection signal;
- a clock signal generating circuit, coupled with the adjusting circuit, configured to operably adjust a frequency of a clock signal according to the adjustment signal;
- a periodical signal generating circuit, coupled with the clock signal generating circuit, configured to operably generate a periodical signal according to the clock signal;
- an error detection circuit, configured to operably generate an error signal according to a reference signal and a feedback signal corresponding to an output voltage signal of the power converter when coupled with the power converter; and
- a control signal generating circuit, coupled with the periodical signal generating circuit and the error detection circuit, configured to operably generate a control signal according to the periodical signal and the error signal to control operations of the first power switch;
- wherein when the power converter operates at a discontinuous conduction mode, if a width of a pulse generated by the zero current detection circuit in multiple clock cycles is less than a first predetermined width and an amount of pulses generated by the zero current detection circuit in the multiple clock cycles is greater than a first predetermined value, the adjusting circuit utilizes the adjustment signal to control the clock signal generating circuit to increase the frequency of the clock signal, so as to enable the periodical signal generating circuit to increase a frequency of the periodical signal to switch the power converter from the discontinuous conduction mode to a continuous conduction mode, and a first switching frequency of the first power switch at the discontinuous conduction mode is lower than a second switching frequency of the first power switch at the continuous conduction mode.

2. The control circuit of claim 1, wherein the power converter further comprises a second power switch, a first terminal of the second power switch is coupled with the predetermined terminal of the inductor, and a second terminal of the second power switch is coupled with the voltage output terminal;
- wherein the control signal generating circuit utilizes the control signal to control operations of the second power switch, and a third switching frequency of the second power switch at the discontinuous conduction mode is lower than a fourth switching frequency of the second power switch at the continuous conduction mode.

3. The control circuit of claim 1, wherein the power converter further comprises a diode, an input terminal of the diode is coupled with the predetermined terminal of the inductor, and an output terminal of the diode is coupled with the voltage output terminal.

4. The control circuit of claim 1, wherein the adjusting circuit further comprises:
- a counter, coupled with the zero current detection circuit and the clock signal generating circuit, configured to operably calculate an amount of pulses in the zero current detection signal to generate a count value; and
- a decision unit, coupled with the counter, and if the count value generated by the counter in the multiple clock cycles is greater than the first predetermined value, the decision unit utilizes the adjustment signal to control the clock signal generating circuit to increase the frequency of the clock signal.

5. The control circuit of claim 4, wherein when the power converter operates at the continuous conduction mode, if the width of the pulse generated by the zero current detection circuit in the multiple clock cycles is greater than a second predetermined width and the amount of the pulses generated by the zero current detection circuit in the multiple clock cycles is greater than a second predetermined value, the decision unit utilizes the adjustment signal to control the clock signal generating circuit to decrease the frequency of the clock signal, so as to enable the periodical signal generating circuit to decrease the frequency of the periodical signal to switch the power converter from the continuous conduction mode to the discontinuous conduction mode.

6. The control circuit of claim 4, wherein the counter is configured to operably calculate an amount of continual pulses in the zero current detection signal in the multiple clock cycles.

7. A control circuit of a power converter, the power converter comprising an inductor and a first power switch, a first terminal of the first power switch being coupled with a predetermined terminal of the inductor, and a second terminal of the first power switch being coupled with a fixed voltage terminal, the control circuit comprising:
- a zero current detection circuit, configured to operably detect a current flowing between the predetermined terminal and a voltage output terminal of the power converter to generate a zero current detection signal;
- an adjusting circuit, coupled with the zero current detection circuit, configured to operably generate an adjustment signal according to the zero current detection signal;
- a clock signal generating circuit, coupled with the adjusting circuit, configured to operably adjust a frequency of a clock signal according to the adjustment signal;
- a periodical signal generating circuit, coupled with the clock signal generating circuit, configured to operably generate a periodical signal according to the clock signal;
- an error detection circuit, configured to operably generate an error signal according to a reference signal and a feedback signal corresponding to an output voltage signal of the power converter when coupled with the power converter; and
- a control signal generating circuit, coupled with the periodical signal generating circuit and the error detection circuit, configured to operably generate a control signal according to the periodical signal and the error signal to control operations of the first power switch;
- wherein when the power converter operates at a continuous conduction mode, if a width of a pulse generated by the zero current detection circuit in multiple clock cycles is greater than a second predetermined width and an amount of pulses generated by the zero current detection circuit in the multiple clock cycles is greater than a second predetermined value, the adjusting circuit utilizes the adjustment signal to control the clock signal generating circuit to decrease the frequency of the clock signal, so as to enable the periodical signal generating circuit to decrease a frequency of the periodical signal to switch the power converter from the continuous conduction mode to a discontinuous conduction mode, and a first switching frequency of the first power switch at the discontinuous conduction mode is lower than a second switching frequency of the first power switch at the continuous conduction mode.

8. The control circuit of claim 7, wherein the power converter further comprises a second power switch, a first terminal of the second power switch is coupled with the predetermined terminal, and a second terminal of the second power switch is coupled with the voltage output terminal;

wherein the control signal generating circuit utilizes the control signal to control operations of the second power switch, and a third switching frequency of the second power switch at the discontinuous conduction mode is lower than a fourth switching frequency of the second power switch at the continuous conduction mode.

9. The control circuit of claim 7, wherein the power converter further comprises a diode, an input terminal of the diode is coupled with the predetermined terminal, and an output terminal of the diode is coupled with the voltage output terminal.

10. The control circuit of claim 7, wherein the adjusting circuit further comprises:
a counter, coupled with the zero current detection circuit and the clock signal generating circuit, configured to operably calculate an amount of pulses in the zero current detection signal to generate a count value; and
a decision unit, coupled with the counter, and if the count value generated by the counter in the multiple clock cycles is greater than the second predetermined value, the decision unit utilizes the adjustment signal to control the clock signal generating circuit to decrease the frequency of the clock signal.

11. A control circuit of a power converter, the power converter comprising an inductor, the control circuit comprising:
a first power switch, wherein a first terminal of the first power switch is coupled with a predetermined terminal of the inductor, and a second terminal of the first power switch is coupled with a fixed voltage terminal;
a zero current detection circuit, coupled between the predetermined terminal and a voltage output terminal of the power converter, configured to operably detect a current flowing between the predetermined terminal and the voltage output terminal to generate a zero current detection signal;
an adjusting circuit, coupled with the zero current detection circuit, configured to operably generate an adjustment signal according to the zero current detection signal;
a clock signal generating circuit, coupled with the adjusting circuit, configured to operably adjust a frequency of a clock signal according to the adjustment signal;
a periodical signal generating circuit, coupled with the clock signal generating circuit, configured to operably generate a periodical signal according to the clock signal;
an error detection circuit, configured to operably generate an error signal according to a reference signal and a feedback signal corresponding to an output voltage signal of the power converter when coupled with the power converter; and
a control signal generating circuit, coupled with the periodical signal generating circuit and the error detection circuit, configured to operably generate a control signal according to the periodical signal and the error signal to control operations of the first power switch;
wherein when the power converter operates at a discontinuous conduction mode, if a width of a pulse generated by the zero current detection circuit in multiple clock cycles is less than a first predetermined width and an amount of pulses generated by the zero current detection circuit in the multiple clock cycles is greater than a first predetermined value, the adjusting circuit utilizes the adjustment signal to control the clock signal generating circuit to increase the frequency of the clock signal, so as to enable the periodical signal generating circuit to increase a frequency of the periodical signal to switch the power converter from the discontinuous conduction mode to a continuous conduction mode, and a first switching frequency of the first power switch at the discontinuous conduction mode is lower than a second switching frequency of the first power switch at the continuous conduction mode.

12. The control circuit of claim 11, further comprising:
a second power switch, wherein a first terminal of the second power switch is coupled with the predetermined terminal, and a second terminal of the second power switch is coupled with the voltage output terminal;
wherein the control signal generating circuit utilizes the control signal to control operations of the second power switch, and a third switching frequency of the second power switch at the discontinuous conduction mode is lower than a fourth switching frequency of the second power switch at the continuous conduction mode.

13. The control circuit of claim 11, further comprising:
a diode, wherein an input terminal of the diode is coupled with the predetermined terminal, and an output terminal of the diode is coupled with the voltage output terminal.

14. The control circuit of claim 11, wherein the adjusting circuit further comprises:
a counter, coupled with the zero current detection circuit and the clock signal generating circuit, configured to operably calculate an amount of pulses in the zero current detection signal to generate a count value; and
a decision unit, coupled with the counter, and if the count value generated by the counter in the multiple clock cycles is greater than the first predetermined value, the decision unit utilizes the adjustment signal to control the clock signal generating circuit to increase the frequency of the clock signal.

15. The control circuit of claim 14, wherein when the power converter operates at the continuous conduction mode, if the width of the pulse generated by the zero current detection circuit in the multiple clock cycles is greater than a second predetermined width and the amount of the pulses generated by the zero current detection circuit in the multiple clock cycles is greater than a second predetermined value, the decision unit utilizes the adjustment signal to control the clock signal generating circuit to decrease the frequency of the clock signal, so as to enable the periodical signal generating circuit to decrease the frequency of the periodical signal to switch the power converter from the continuous conduction mode to the discontinuous conduction mode.

16. The control circuit of claim 14, wherein the counter is configured to operably calculate an amount of continual pulses in the zero current detection signal in the multiple clock cycles.

17. A control circuit of a power converter, the power converter comprising an inductor, the control circuit comprising:
a first power switch, wherein a first terminal of the first power switch is coupled with a predetermined terminal of the inductor, and a second terminal of the first power switch is coupled with a fixed voltage terminal;
a zero current detection circuit, coupled between the predetermined terminal and a voltage output terminal of the power converter, configured to operably detect a current flowing between the predetermined terminal and the voltage output terminal to generate a zero current detection signal;
an adjusting circuit, coupled with the zero current detection circuit, configured to operably generate an adjustment signal according to the zero current detection signal;
a clock signal generating circuit, coupled with the adjusting circuit, configured to operably adjust a frequency of a clock signal according to the adjustment signal;
a periodical signal generating circuit, coupled with the clock signal generating circuit, configured to operably generate a periodical signal according to the clock signal;
an error detection circuit, configured to operably generate an error signal according to a reference signal and a feedback signal corresponding to an output voltage signal of the power converter when coupled with the power converter; and
a control signal generating circuit, coupled with the periodical signal generating circuit and the error detection circuit, configured to operably generate a control signal according to the periodical signal and the error signal to control operations of the first power switch;
wherein when the power converter operates at a continuous conduction mode, if a width of a pulse generated by the zero current detection circuit in multiple clock cycles is greater than a second predetermined width and an amount of pulses generated by the zero current detection circuit in the multiple clock cycles is greater than a second predetermined value, the adjusting circuit utilizes the adjustment signal to control the clock signal generating circuit to decrease the frequency of the clock signal, so as to enable the periodical signal generating circuit to decrease a frequency of the periodical signal to switch the power converter from the continuous conduction mode to a discontinuous conduction mode, and a first switching frequency of the first power switch at the discontinuous conduction mode is lower than a second switching frequency of the first power switch at the continuous conduction mode.

18. The control circuit of claim 17, further comprising:
a second power switch, wherein a first terminal of the second power switch is coupled with the predetermined terminal, and a second terminal of the second power switch is coupled with the voltage output terminal;
wherein the control signal generating circuit utilizes the control signal to control operations of the second power switch, and a third switching frequency of the second power switch at the discontinuous conduction mode is lower than a fourth switching frequency of the second power switch at the continuous conduction mode.

19. The control circuit of claim 17, further comprising:
a diode, wherein an input terminal of the diode is coupled with the predetermined terminal, and an output terminal of the diode is coupled with the voltage output terminal.

20. The control circuit of claim 17, wherein the adjusting circuit further comprises:
a counter, coupled with the zero current detection circuit and the clock signal generating circuit, configured to operably calculate an amount of pulses in the zero current detection signal to generate a count value; and
a decision unit, coupled with the counter, and if the count value generated by the counter in the multiple clock cycles is greater than the second predetermined value, the decision unit utilizes the adjustment signal to control the clock signal generating circuit to decrease the frequency of the clock signal.

21. A control method of a power converter, the power converter comprising an inductor and a first power switch, a first terminal of the first power switch being coupled with a predetermined terminal of the inductor, and a second terminal of the first power switch being coupled with a fixed voltage terminal, the control method comprising:
utilizing a zero current detection circuit to detect a current flowing between the predetermined terminal and a voltage output terminal of the power converter to generate a zero current detection signal;
generating an adjustment signal according to the zero current detection signal;
utilizing a clock signal generating circuit to adjust a frequency of a clock signal according to the adjustment signal;
generating a periodical signal according to the clock signal;
generating an error signal according to a reference signal and a feedback signal corresponding to an output voltage signal of the power converter;
generating a control signal according to the periodical signal and the error signal to control operations of the first power switch; and
when the power converter operates at a discontinuous conduction mode, if a width of a pulse generated by the zero current detection circuit in multiple clock cycles is less than a first predetermined width and an amount of pulses generated by the zero current detection circuit in the multiple clock cycles is greater than a first predetermined value, utilizing the adjustment signal to control the clock signal generating circuit to increase the frequency of the clock signal, so as to increase a frequency of the periodical signal to switch the power converter from the discontinuous conduction mode to a continuous conduction mode;
wherein a first switching frequency of the first power switch at the discontinuous conduction mode is lower than a second switching frequency of the first power switch at the continuous conduction mode.

22. The control method of claim 21, further comprising:
when the power converter operates at the continuous conduction mode, if the width of the pulse generated by the zero current detection circuit in the multiple clock cycles is greater than a second predetermined width and the amount of the pulses generated by the zero current detection circuit in the multiple clock cycles is greater than a second predetermined value, utilizing the adjustment signal to decrease the frequency of the clock signal, so as to decrease the frequency of the periodical signal to switch the power converter from the continuous conduction mode to the discontinuous conduction mode.

23. A control method of a power converter, the power converter comprising an inductor and a first power switch, a first terminal of the first power switch being coupled with a predetermined terminal of the inductor, and a second terminal of the first power switch being coupled with a fixed voltage terminal, the control method comprising:

utilizing a zero current detection circuit to detect a current flowing between the predetermined terminal and a voltage output terminal of the power converter to generate a zero current detection signal;

generating an adjustment signal according to the zero current detection signal;

utilizing a clock signal generating circuit to adjust a frequency of a clock signal according to the adjustment signal;

generating a periodical signal according to the clock signal;

generating an error signal according to a reference signal and a feedback signal corresponding to an output voltage signal of the power converter;

generating a control signal according to the periodical signal and the error signal to control operations of the first power switch; and when the power converter operates at a continuous conduction mode, if a width of a pulse generated by the zero current detection circuit in multiple clock cycles is greater than a second predetermined width and an amount of pulses generated by the zero current detection circuit in the multiple clock cycles is greater than a second predetermined value, utilizing the adjustment signal to control the clock signal generating circuit to decrease the frequency of the clock signal, so as to decrease a frequency of the periodical signal to switch the power converter from the continuous conduction mode to a discontinuous conduction mode;

wherein a first switching frequency of the first power switch at the discontinuous conduction mode is lower than a second switching frequency of the first power switch at the continuous conduction mode.

\* \* \* \* \*